(12) United States Patent
Kim

(10) Patent No.: US 11,732,432 B2
(45) Date of Patent: Aug. 22, 2023

(54) METHOD OF CONSTRUCTING UNDERWATER CONCRETE BLOCK STRUCTURE

(71) Applicant: YUJOO CO., LTD., Busan (KR)

(72) Inventor: Sang Gi Kim, Busan (KR)

(73) Assignee: YUJOO CO., LTD., Busan (KR)

( * ) Notice: Subject to any disclaimer, the term of this patent is extended or adjusted under 35 U.S.C. 154(b) by 258 days.

(21) Appl. No.: 17/310,281

(22) PCT Filed: Jan. 23, 2020

(86) PCT No.: PCT/KR2020/001176
§ 371 (c)(1),
(2) Date: Jul. 27, 2021

(87) PCT Pub. No.: WO2020/166846
PCT Pub. Date: Aug. 20, 2020

(65) Prior Publication Data
US 2022/0162824 A1    May 26, 2022

(30) Foreign Application Priority Data
Feb. 11, 2019    (KR) .................. 10-2019-0015464

(51) Int. Cl.
*E02D 15/08*      (2006.01)
*E02D 25/00*      (2006.01)
*E02D 27/42*      (2006.01)
*E02D 27/52*      (2006.01)

(52) U.S. Cl.
CPC ............. *E02D 15/08* (2013.01); *E02D 25/00* (2013.01); *E02D 27/42* (2013.01); *E02D 27/52* (2013.01); *E02D 2600/20* (2013.01)

(58) Field of Classification Search
CPC combination set(s) only.
See application file for complete search history.

(56) References Cited

U.S. PATENT DOCUMENTS

| 5,087,150 | A  | * | 2/1992 | McCreary | ................. E02B 3/06 405/16 |
| 2003/0138296 | A1 | * | 7/2003 | O'Hare | .................... E02B 3/06 405/15 |
| 2020/0173132 | A1 | * | 6/2020 | Lee | ......................... E02D 19/04 |

FOREIGN PATENT DOCUMENTS

| JP | 2000336629 A | * 12/2000 |
| KR | 10-0445260 B1 | 8/2004 |
| KR | 10-2011-0055761 A | 5/2011 |

(Continued)

OTHER PUBLICATIONS

International Search Report for PCT/KR2020/001176 dated May 4, 2020 from Korean Intellectual Property Office.

*Primary Examiner* — Kyle Armstrong
(74) *Attorney, Agent, or Firm* — Paratus Law Group, PLLC

(57) ABSTRACT

Disclosed is a method of constructing an underwater concrete block structure, including: fabricating a plurality of concrete blocks having a vertical hole extending in the vertical direction; forming a foundation concrete block structure by installing the concrete block on the seafloor; vertically installing at least one guide pole in the foundation concrete block structure; forming a concrete block stack by repeating a process of positioning the concrete block to be installed above the surface of the water; and forming a main concrete column for binding the plurality of concrete blocks.

7 Claims, 19 Drawing Sheets

(56) References Cited

FOREIGN PATENT DOCUMENTS

| KR | 10-1355805 | B1 | | 1/2014 |
|----|------------|----|----|--------|
| KR | 10-1793984 | B1 | | 11/2017 |
| KR | 10-1910816 | B1 | | 10/2018 |
| KR | 10-2022339 | B1 | | 9/2019 |
| KR | 102148899 | B1 | * | 10/2020 |

* cited by examiner

METHOD OF CONSTRUCTING UNDERWATER CONCRETE BLOCK STRUCTURE

CROSS-REFERENCE TO PRIOR APPLICATIONS

This application is a National Stage Patent Application of PCT International Patent Application No. PCT/KR2020/001176 (filed on Jan. 23, 2020) under 35 U.S.C. § 371, which claims priority to Korean Patent Application No. 10-2019-0015464 (filed on Feb. 11, 2019), which are all hereby incorporated by reference in their entirety.

BACKGROUND

The present invention relates to an underwater concrete block structure construction method for easily constructing an underwater concrete block structure using concrete blocks in the water.

Generally, examples of underwater structures to be installed underwater include a submerged breakwater or an offshore breakwater. The submerged breakwater is installed so that the upper surface of the structure is located below the water surface, thereby reducing the force of the waves coming from the ocean. The offshore breakwater is installed so that the upper surface of the structure is located above the water surface, thereby reducing the force of the waves coming from the ocean.

In order to easily install such an underwater structure, a technique of stacking a plurality of concrete blocks in the water to form an underwater structure and binding the plurality of concrete blocks by using concrete column for binding has been proposed.

However, in the related art, while an underwater concrete block needs to be installed on the upper part of another concrete block in the water, due to the difficulty in securing visibility in the water, it is difficult to install the concrete block in the correct position and it takes a long time to perform the installation.

In addition, since a concrete block positioned around the surface of the water is simply stacked on top of other concrete blocks (i.e., the concrete block is not bound to other concrete blocks), a problem arises in that the concrete block is easy to move away from the original position when subjected to a strong shock caused by a sudden tide or wave.

SUMMARY

Accordingly, the present invention has been made keeping in mind the above problems occurring in the related art, and an objective of the present invention is to provide a method of constructing an underwater concrete block structure, whereby during the underwater construction of the underwater concrete block structure, the concrete blocks are easily installed as if they are in the same environment as performing the installation above the water surface, and the concrete block is prevented from deviating from the correct position even under a strong impact caused by a sudden tide or wave.

In order to achieve the above and other objectives, according to one aspect of the present invention, there is provided a method of constructing an underwater concrete block structure, the method including: fabricating a plurality of concrete blocks having a vertical hole extending in the vertical direction; after the concrete block fabricating step, forming a foundation concrete block structure by installing the concrete block on the seafloor; after the foundation concrete block structure formation step, vertically installing at least one guide pole in the foundation concrete block structure by inserting a lower end of the guide pole extending in the vertical direction into the vertical hole of the concrete blocks forming the foundation concrete block structure so that an upper end of the guide pole protrudes above the surface of the water; after the guide pole installation step, forming a concrete block stack by repeating a process of positioning the concrete block to be installed above the surface of the water such that the vertical hole of the concrete block to be installed is above the guide pole, and lowering the concrete block to be installed so that the concrete block to be installed is installed on an upper portion of the foundation concrete block structure in a state in which the guide pole is inserted into the vertical hole of the concrete block to be installed; and after the concrete block stack formation step, forming a main concrete column for binding the plurality of concrete blocks, extending in the vertical direction in a main continuous hole, the main continuous hole defining both the space in which the guide pole is removed by removing the guide poles disposed in the concrete block stack and the space in which the vertical holes of the concrete blocks vertically stacked on one another are continuously connected in the vertical direction.

At least two vertical holes may be formed in the concrete block in the concrete block fabricating step, at least two guide poles may be installed for each of the concrete blocks forming the foundation concrete block structure in the guide pole installation step, and the concrete block to be installed may be installed on the upper portion of the foundation concrete block structure in a state in which at least two guide poles are inserted into the vertical holes of the concrete block to be installed in the concrete block stack formation step.

The main concrete column formation step may include: forming a first main concrete column for binding the plurality of concrete blocks, extending in the vertical direction in a first main continuous hole, the first main continuous hole defining both the space in which some of the guide poles is removed by removing some of the guide poles disposed in the concrete block stack and the space in which the vertical holes of the concrete blocks vertically stacked on one another are continuously connected in the vertical direction; and after the first main concrete column formation step, forming a second main concrete column for binding the plurality of concrete blocks, extending in the vertical direction in a second main continuous hole, the second main continuous hole defining both the space in which the remaining guide pole is removed by removing the remaining guide poles in the concrete block stack and the space in which the vertical holes of the concrete blocks vertically stacked on one another are continuously connected in the vertical direction, wherein the first main concrete column is formed in one of the vertical holes of the concrete block forming the concrete block stack, and the second main concrete column is formed in the other vertical hole of the concrete block forming the concrete block stack.

In the concrete block fabricating step, at least three vertical holes may be formed in the concrete block, wherein the concrete block stack formed in the concrete block stack formation step is provided with an auxiliary continuous hole that defines both the space in which the guide pole has not been inserted and the space in which the vertical holes of the concrete blocks vertically stacked on one another are continuously connected in the vertical direction, wherein between the concrete block stack formation step and the main concrete column formation step, an auxiliary concrete column for binding the plurality of concrete blocks is formed in the auxiliary continuous hole The guide pole may have a hollow body portion formed to extend in the vertical direction in a shape corresponding to the cross section of the vertical hole of the concrete block, and an upper insert portion formed on an upper end of the body portion in an upwardly tapered shape.

The vertical hole of the concrete block may be a through hole penetrating through the concrete block in the vertical direction.

The vertical hole of the concrete block forming the foundation concrete block structure may be a blind hole in which an upper part thereof is open and a lower part thereof is blocked, wherein the vertical hole of the concrete block to be installed in the concrete block stack formation step is a through hole penetrating through the concrete block in the vertical direction.

According to the underwater concrete block structure construction method, during the underwater construction of the underwater concrete block structure, the concrete blocks can be easily and quickly installed as if they are in the same environment as performing the installation above the water surface.

That is, after the foundation concrete block structure is formed on the seafloor and guide poles are installed, other concrete blocks are stacked while being guided by the installed guide poles, thereby quickly and precisely locating the concrete blocks in the correct positions even under the situation of the difficulty in securing the visibility in the water.

Furthermore, the present invention can reliably prevent the positional deviation of the concrete block even in the event of a strong impact caused by a sudden tide or a wave generated during construction.

In other words, even when the concrete blocks are not bound by the concrete column for binding, the concrete blocks are fixed by the guide poles so that the concrete blocks do not leave the designated positions.

DETAILED DESCRIPTION

Figure 1:
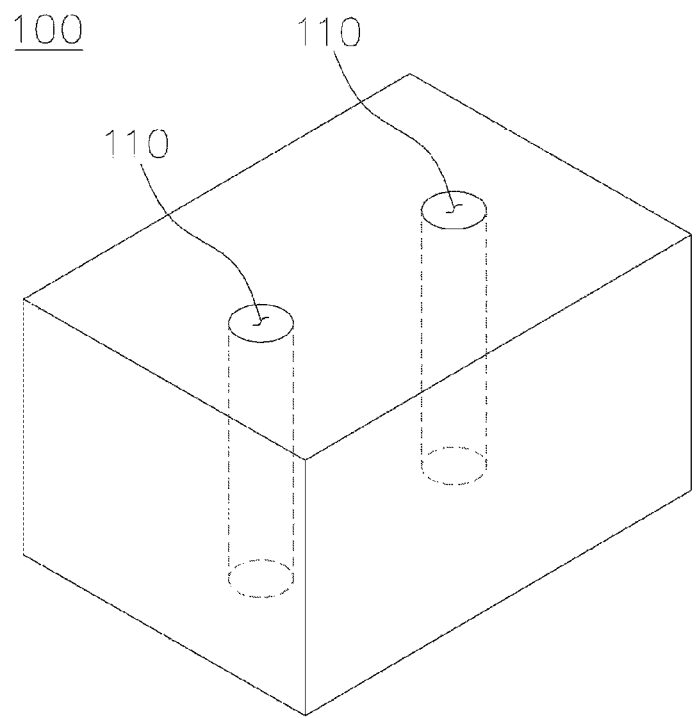
FIG. 1 is a perspective view of a concrete block used in a method of constructing an underwater concrete block structure according to a first embodiment of the present invention.

Hereinbelow, exemplary embodiments of the present invention will be described in detail with reference to the accompanying drawings to allow those skilled in the art to easily implement the embodiments. However, the present invention is not limited to those embodiments, but may be implemented into other forms. In the drawings, parts irrelevant to the description are omitted for simplicity of explanation, and like reference numerals designate like parts throughout the specification. Throughout the specification, the expression describing that an element "includes" a component means that the element may further include other configurations unless the context clearly indicates otherwise.

The method of constructing an underwater concrete block structure according to a first embodiment of the present invention will be described.

FIG. 1 is a perspective view of a concrete block used in the method of constructing the underwater concrete block structure according to the first embodiment of the present invention, and FIGS. 2 to 11 are views illustrating in sequence the method of constructing the underwater concrete block structure according to the first embodiment of the present invention.

First, a plurality of concrete block are fabricated.

FIG. 1 illustrates the concrete block 100 used in this embodiment. The concrete block 100 is to be stacked in the water for construction of the underwater concrete block structure. In the present embodiment, the concrete block is a rectangular parallelepiped concrete block with two vertical holes 110 extending in the vertical direction through the concrete block 100.

The vertical hole 110 of the concrete block 100 in this embodiment is a penetrating hole that penetrates the concrete block 100 in the vertical direction.

Although not illustrated in the drawings, a crane connection structure (not shown) may be further provided on the concrete block 100 so that the concrete block 100 may be lifted and installed using a crane. For example, a connecting wire rope through a tube or a lifting ring member, which is disclosed in Korean Patent No. 10-1220995, may be provided. In this regard, Korean Patent No. 10-1220995 is to be incorporated herein.

After the concrete block is fabricated, a foundation concrete block structure 100a is formed by installing the concrete block 100 (at least one concrete block 100) on the seafloor 10.

Figure 2:
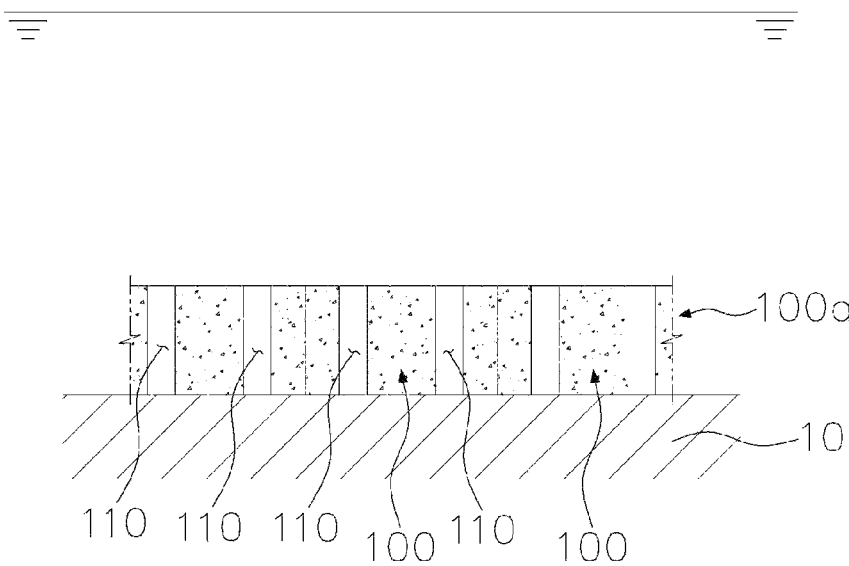
FIGS. 2 to 11 are views illustrating in sequence the method of constructing the underwater concrete block structure according to the first embodiment of the present invention.
Figure 3:
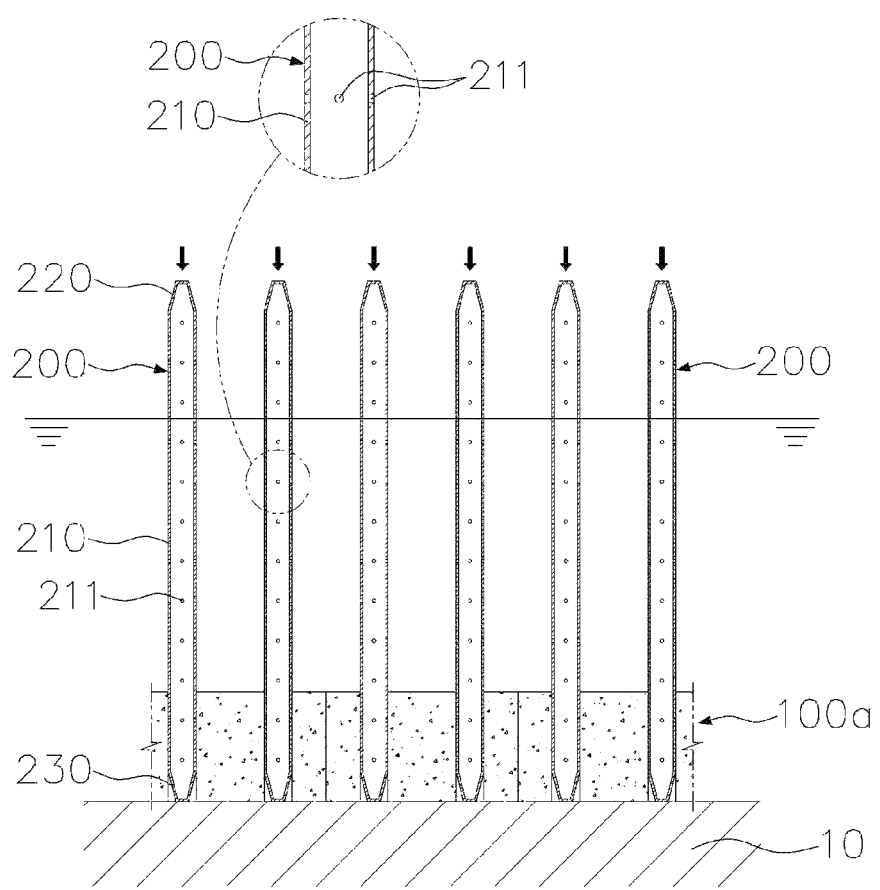

In the present exemplary embodiment, the foundation concrete block structure 100a is formed in a shape in which a plurality of concrete blocks 100 are arranged in left and right directions on the seafloor 10 as shown in FIG. 2.

The foundation concrete block structure 100a may be formed in a single layer on the seafloor 10, or in other embodiments, the foundation concrete block structure may be formed in two layers by stacking another concrete block 100 on top of the concrete block 100 disposed on the seafloor 10.

After the foundation concrete block structure is formed, at least one guide pole 200 is installed.

In the guide pole installation step, the at least one guide pole 200 extending in the vertical direction is required.

The guide pole 200 is vertically installed in the foundation concrete block structure 100a by inserting the lower end of the guide pole 200 into the vertical hole 110 of the concrete block 100 forming the foundation concrete block structure 100a.

The guide pole 200 has a hollow body portion 210 formed to extend in the vertical direction in a shape corresponding to the cross section of the vertical hole 110 of the concrete block 100, an upper insert portion 220 formed on the upper end of the body portion 210 in an upwardly tapered shape, and a lower insert portion 230 formed on the lower end of the body portion 210 in a downwardly tapered shape.

The guide pole 200 is provided with a plurality of communication holes 211 communicating between the outside and the hollow part of the body portion 210. The communication hole 211 serves to allow water to flow into or out of the interior of the body portion 210 when the guide pole 200 is immerged into the water or lifted above the surface of the water.

Since the guide pole 200 is a hollow pillar shape, the guide pole is very light and can be easily transported and used. In addition, when the guide pole 200 is immerged into the water, water is introduced into the guide pole 200 through the communication holes 211, so that floating of the guide pole 200 due to buoyancy is prevented, and when the guide pole 200 is lifted above the surface of the water, the water is discharged out of the guide pole through the communication holes 211 so that the weight of the guide pole 200 can be reduced and the guide pole can be easily drawn out of the water.

The upper insert portion 220 formed on the upper end of the guide pole 200 serves to allow the upper end of the guide pole 200 to be easily inserted into the vertical hole 110 of the concrete block 100 to be installed.

The lower insert portion 230 formed on the lower end of the guide pole 200 serves to allow the lower end of the guide pole 200 to be easily inserted into the vertical hole 110 of the concrete block 100 forming the foundation concrete block structure 100a.

The guide poles 200 are vertically installed in the foundation concrete block structure 100a by respectively inserting the lower ends of the guide poles 200 into the vertical holes 110 of the concrete blocks 100 forming the foundation concrete block structure 100a.

Although the guide pole 200 is a hollow metal structure in the present embodiment, according to embodiments, the guide pole 200 may be a solid concrete structure.

In the present embodiment, since the concrete block 100 is provided with two vertical holes 110, two guide poles 200 are inserted into the single concrete block 100.

Two or more guide poles 200 had better be installed in one concrete block 100 because the horizontal position and posture of the concrete block 100 to be installed may be securely fixed by the two or more guide poles 200.

The guide pole 200 is longer than the depth of water so that when the guide pole 200 is installed, the upper end of the guide pole 200 protrudes above the surface of the water. When the upper end of the guide pole 200 protrudes above the surface of the water, the position of the guide pole 200 can be easily checked with the naked eye, so that the concrete block 100 to be installed can be installed on the upper portion of the foundation concrete block structure 100a.

That is, the installation position of the concrete block 100 can be easily confirmed above the surface of the water, and the planar positioning of the concrete block 100 can be performed above the surface of the water.

This configuration is obtained by taking account of the fact that the underwater planar positioning of the concrete block 100 as in the related art is difficult to perform because of the difficulty in securing the visibility and planar positioning in the water due to a tidal current or the like.

After the guide pole installation step, the concrete block stack formation step is performed.

Figure 4:
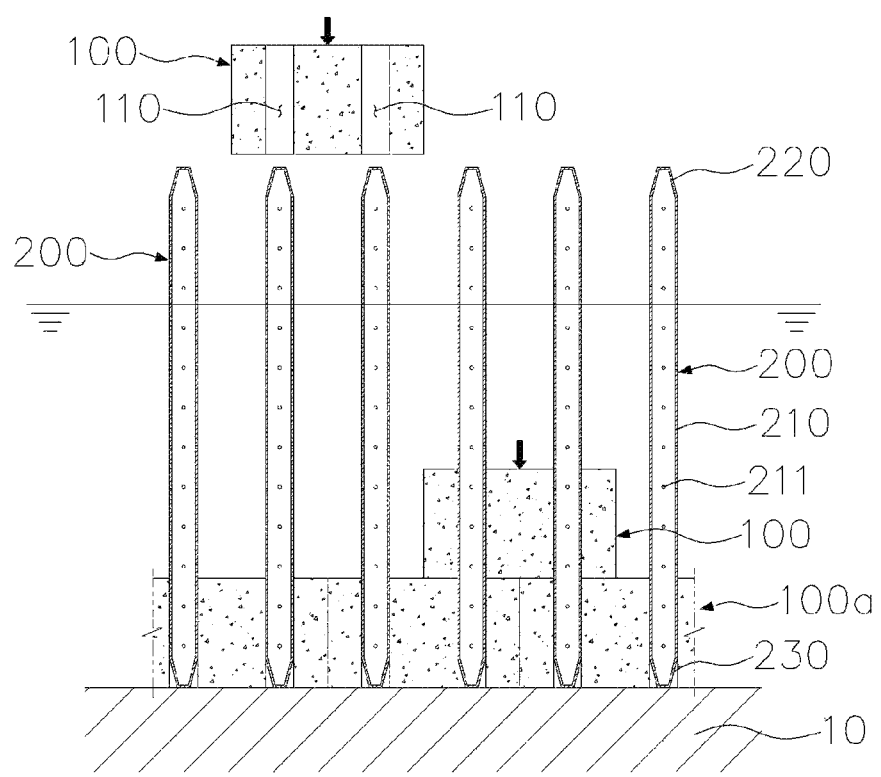
Figure 5:
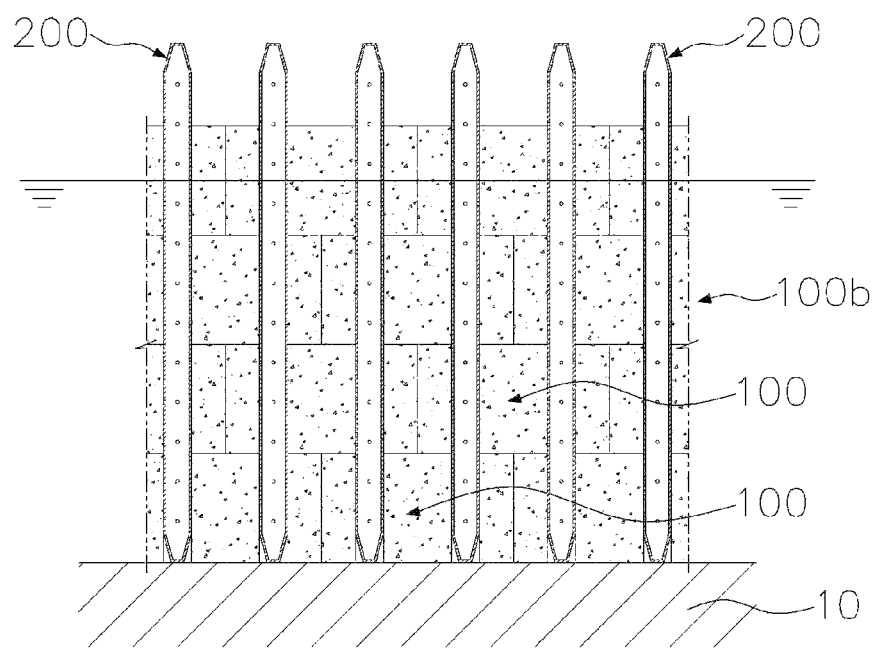

When the installation of the guide pole 200 is completed, a concrete block stack 100b is formed by repeating the process of installing the concrete block 100 to be installed on the upper portion of the foundation concrete block structure 100a while being guided by the guide poles 200, as illustrated in FIGS. 4 and 5.

The installation process of the concrete block 100 to be installed includes the step of positioning the concrete block 100 to be installed above the guide poles 200, and the step of lowering the concrete block 100 after the planar positioning step.

In the planar positioning step, when the concrete block 100 to be installed is placed above the guide poles 200, the concrete block 100 is placed such that the vertical holes 110 of the concrete block 100 is positioned above the guide poles 200. This step takes place very quickly and accurately because it is performed above the surface of the water.

Meanwhile, in the planar positioning step, the concrete block 100 to be installed is positioned to be offset in the left and right directions of the concrete block 100 positioned below.

As such, when the planar positioning step is completed, the concrete block 100 to be installed may be lowered. This step occurs above and below the surface of the water.

When the concrete block 100 to be installed is lowered, the concrete block 100 is seated on the foundation concrete block structure 100a while being inserted around and guided along the guide poles 200 which are inserted into the vertical holes 110 of the concrete block 100 to be installed.

In the present embodiment, since the position and the posture of the concrete block 100 to be installed are guided by the two guide poles 200, the horizontal position and posture of the concrete block 100 to be installed can be securely fixed.

When the concrete block 100 to be installed is installed on the upper portion of the foundation concrete block structure 100a, the two guide poles 200 are in a state of being inserted into the vertical holes 110 of the concrete block 100 to be installed.

By repeating the above process to install a plurality of concrete blocks 100 to be installed on the upper portion of the foundation concrete block structure 100a, a concrete block stack 100b may be formed as illustrated in FIG. 5.

Since the concrete block 100 to be installed is stacked while being guided by the guide poles 200, the concrete block 100 to be installed may be easily installed on the upper portion of the foundation concrete block structure 100a or another concrete block 100 installed thereon.

In particular, even in a place where the installation of the concrete block 100 is difficult because the underwater visibility is not secured, the concrete block 100 can be easily installed according to the guide of the guide poles 200 protruding above the surface of the water. The installed concrete block 100 is bound to the other concrete block 100 by the guide poles 200.

Such a concrete block stack 100b may be regarded in itself as a single underwater concrete block structure.

That is, while the main concrete column for binding may be further formed in order to increase the structural rigidity of the concrete block stack 100b according to the present embodiment, in other embodiments, the guide pole 200 may be permanently installed without removal.

After the concrete block stack formation step, the main concrete column formation step is performed.

In the main concrete column formation step, the guide poles 200 disposed in the concrete block stack 100b are removed, and a plurality of main concrete columns 310 and 320 are formed in main continuous holes 100b-1 and 100b-2 that define both the space in which the guide poles 200 are removed and the space in which the vertical holes 110 of the concrete blocks vertically stacked on one another are connected in the vertical direction.

In the present embodiment, the plurality of guide poles 200 disposed in the concrete block stack 100b are sequentially removed while being divided into two groups, and the main concrete columns 310 and 320 are sequentially formed.

Figure 6:
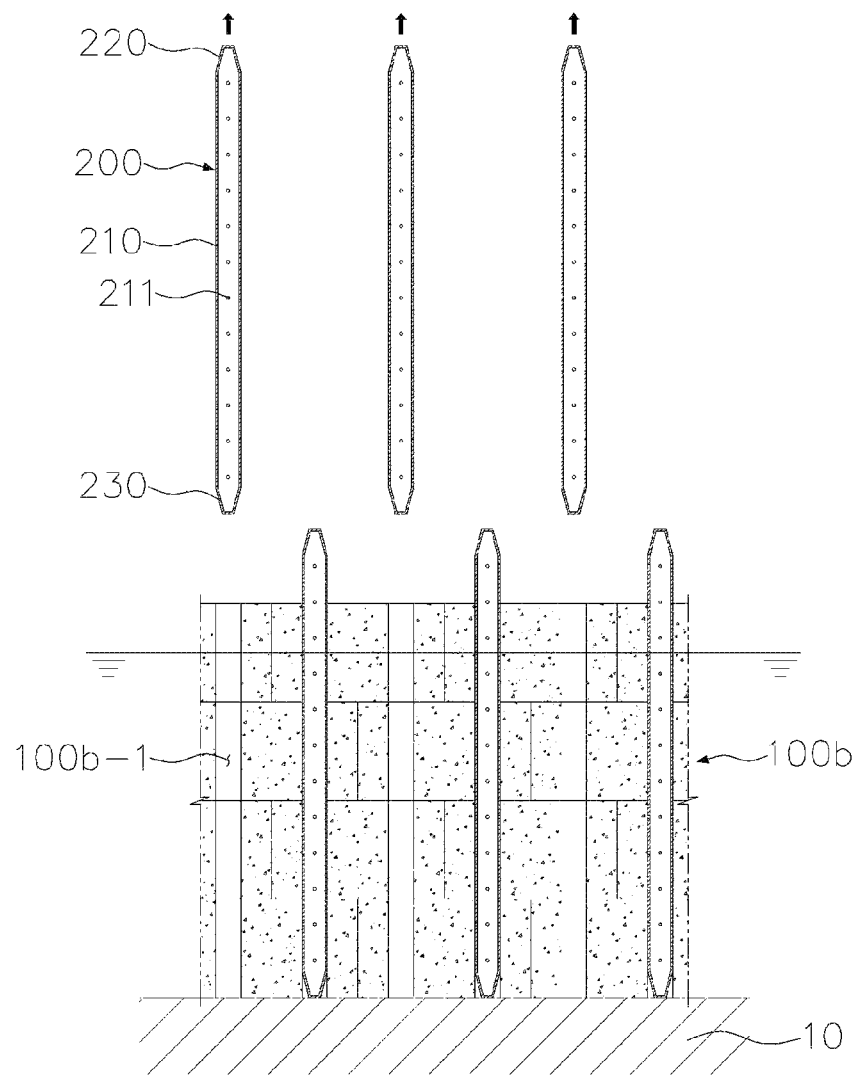

First, as illustrated in FIG. 6, some of the guide poles 200 disposed in the concrete block stack 100b are removed. These guide poles 200 are some of the guide poles 200 installed in the guide pole installation step.

As a result, a first main continuous hole 100b-1 that defines both the spaces in which some of the guide poles 200 is removed and the space in which the vertical holes 110 of the concrete blocks 100 stacked in the vertical direction are continuously connected in the vertical direction is formed.

Figure 7:
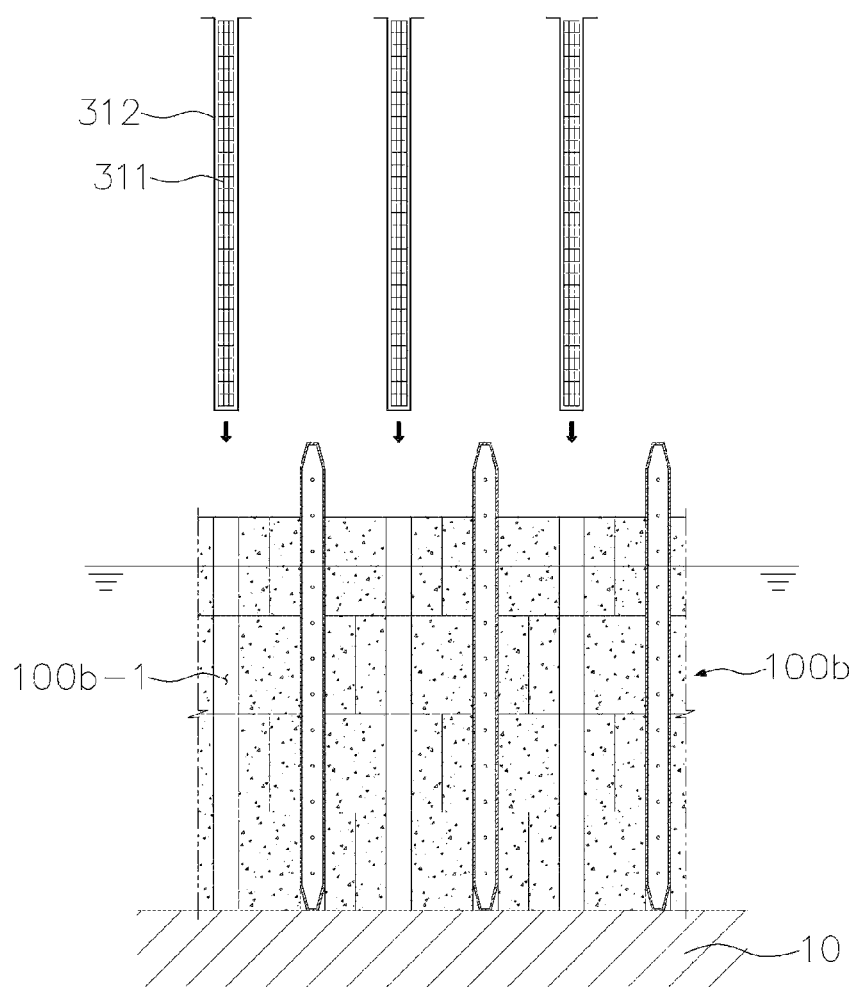
Figure 8:
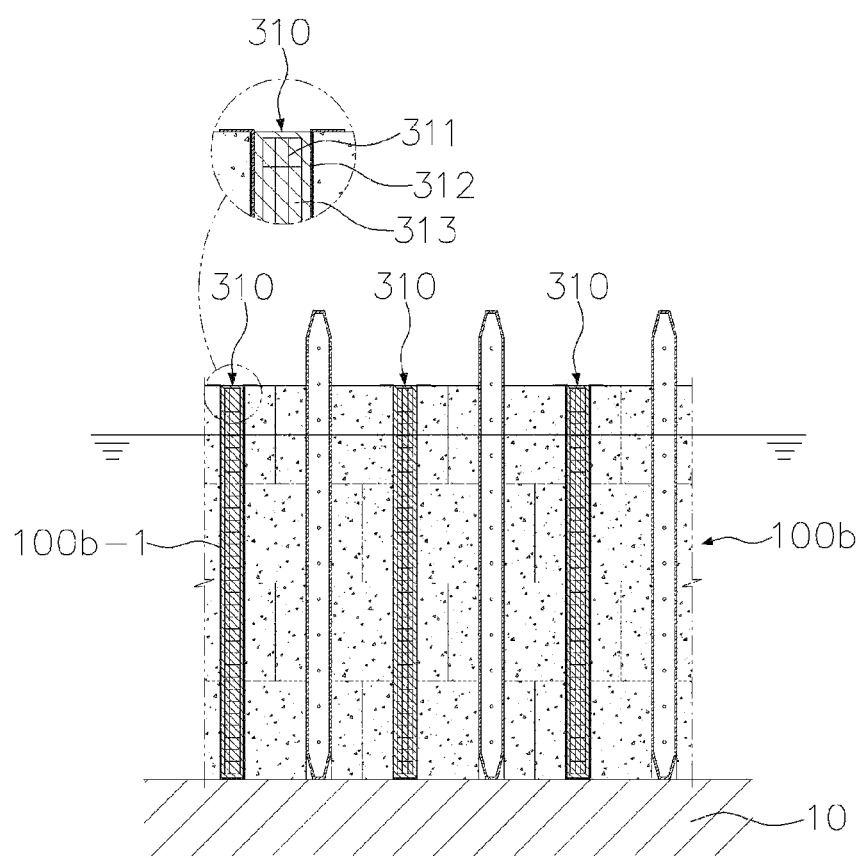

Then, a first reinforcing member 311 extending in the vertical direction and a first waterproof membrane 312 surrounding the lower part and the lateral sides of the first reinforcing member 311 are inserted together into the first main continuous hole 100b-1 as illustrated in FIG. 7, and then a concrete material is injected into the first waterproof membrane 312 and is cured to form the first main concrete part 313 as illustrated in FIG. 8.

Through this process, the first main concrete column 310 is formed in the first main continuous hole 100b-1, so that the plurality of concrete blocks 100 are partially bound to each other by the first main concrete column 310.

Figure 9:
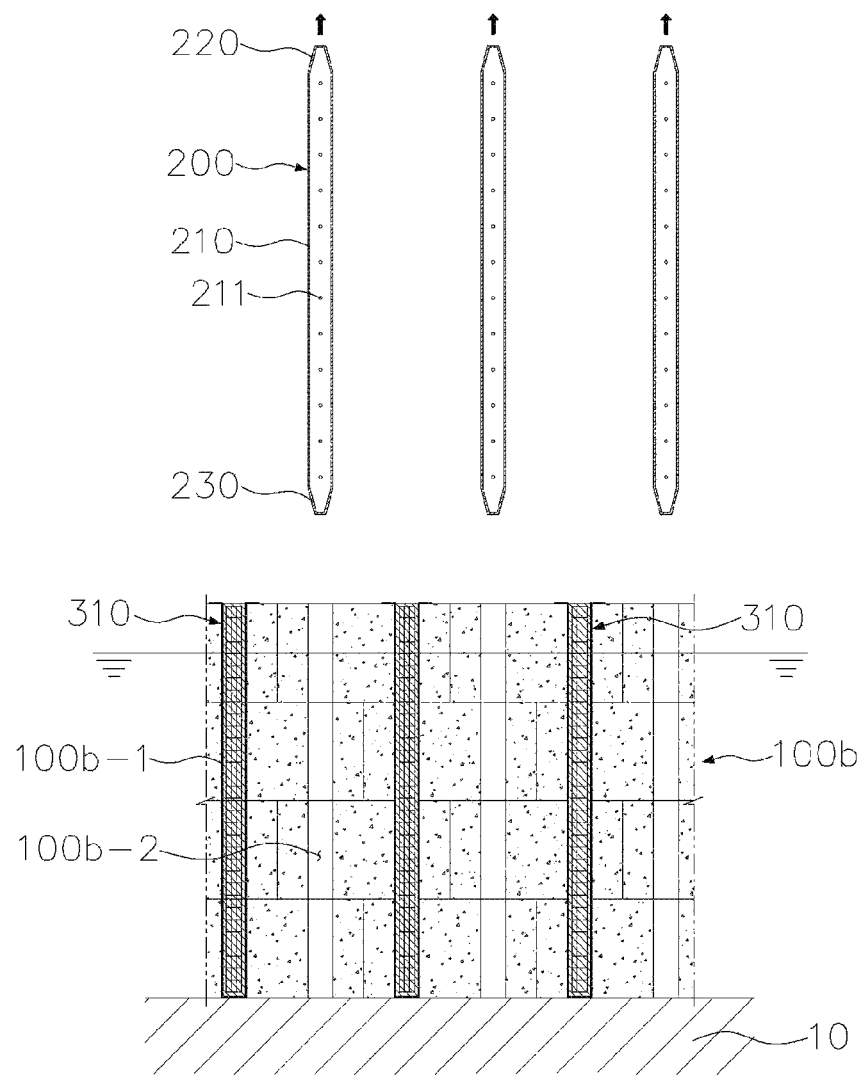

Subsequently, the remaining guide poles 200 disposed in the concrete block stack 100b are removed as illustrated in FIG. 9.

As a result, a second main continuous hole 100b-2 that defines both the spaces in which the remaining guide pole 200 is removed and the space in which the vertical holes 110 of the concrete blocks 100 stacked in the vertical direction are continuously connected in the vertical direction is formed.

Figure 10:
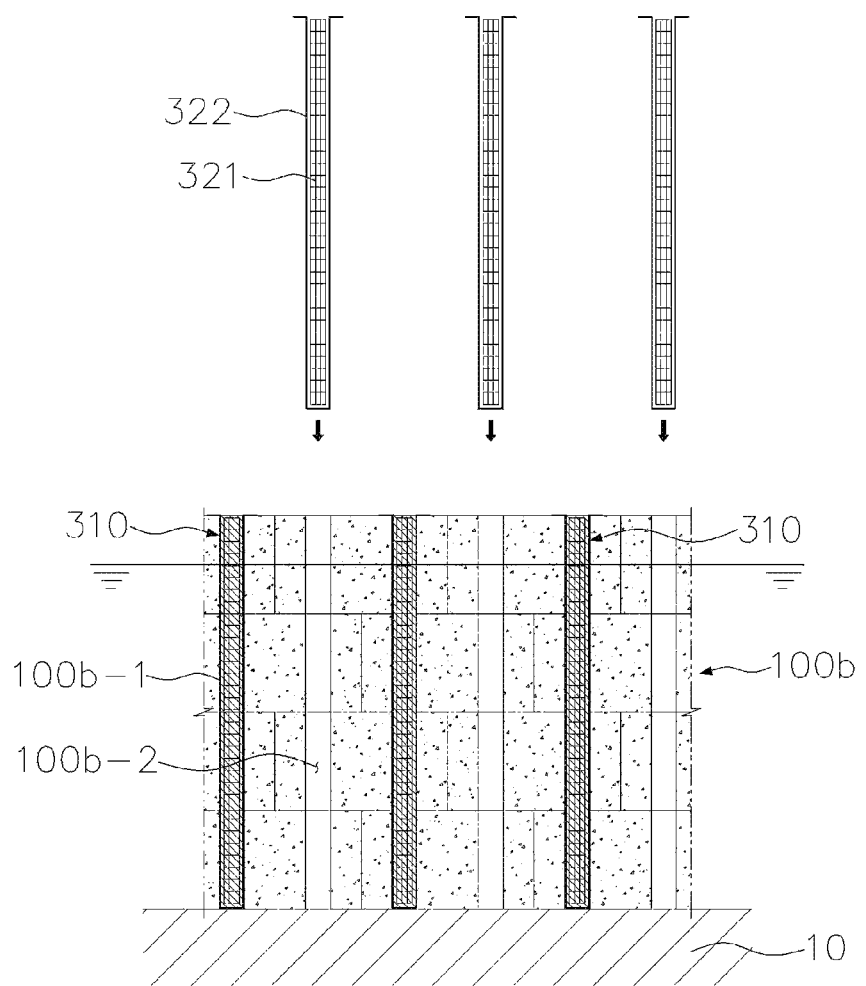
Figure 11:
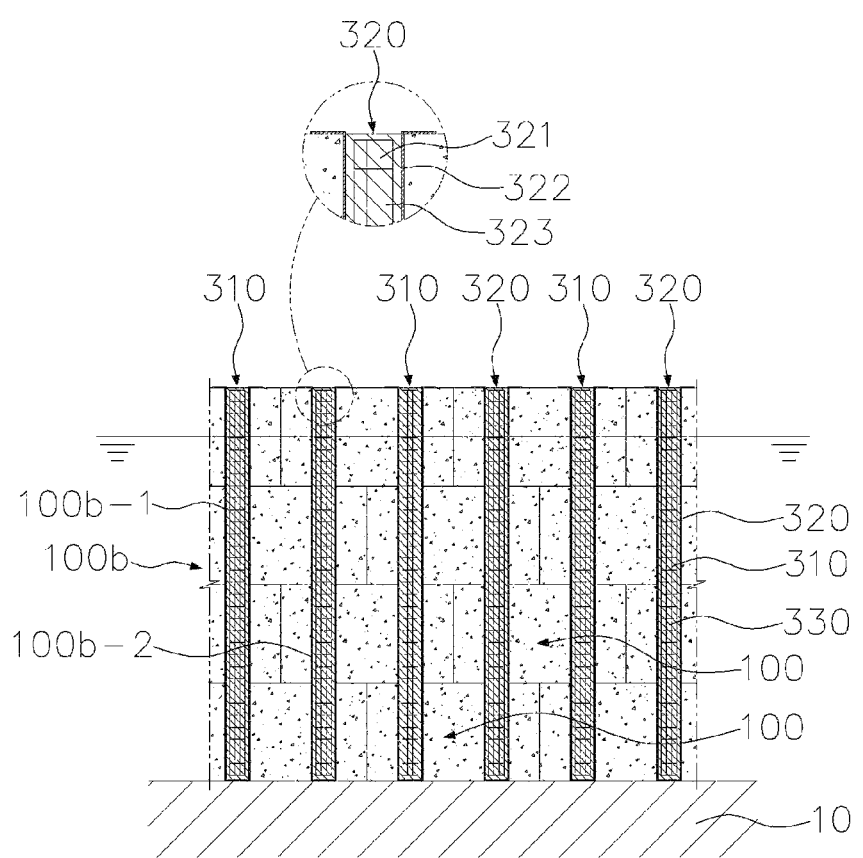

Then, a second reinforcing member 321 extending in the vertical direction and a second waterproof membrane 322 surrounding the lower part and the lateral sides of the second reinforcing member 321 are inserted together into the second main continuous hole 100b-2 as illustrated in FIG. 10, and then a concrete material is injected into the second waterproof membrane 322 and is cured to form the second main concrete part 323 as illustrated in FIG. 11.

Through this process, the second main concrete column 320 is formed in the second main continuous hole 100b-2, so that the plurality of concrete blocks 100 are completely bound to each other by the first and second main concrete columns 310 and 320.

As can be seen from FIG. 11, the first main concrete column 310 is formed in one of the vertical holes 110 of one concrete block 100 constituting the concrete block stack 100b, and the second main concrete column 320 is formed in the other vertical hole 120 of the concrete block 100. The first and second main concrete columns 310 and 320 bind the plurality of concrete blocks 100 adjacent to each other in the vertical direction and the horizontal direction.

As such, when the concrete block stack 100b is formed in the state in which the guide poles 200 are installed, and the first main concrete columns 310 and the second main concrete columns 320 are sequentially constructed while partially removing the guide poles 200, respective concrete blocks 100 are always kept in combination with the other concrete blocks 100, thereby preventing the concrete block stack 100b from being damaged by strong tides or waves during the construction.

Subsequently, the construction method of underwater concrete block structure according to a second embodiment of the present invention will be described.

Figure 12:
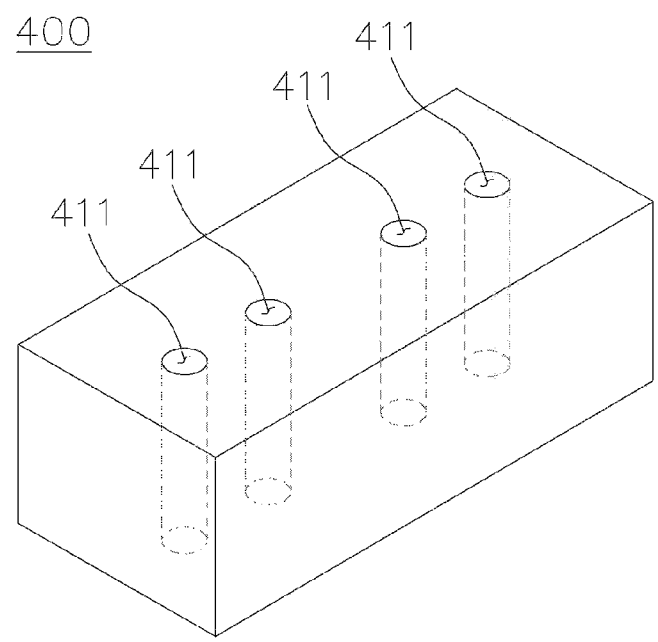
FIG. 12 is a perspective view of a concrete block used in a method of constructing an underwater concrete block structure according to a second embodiment of the present invention.
Figure 22:
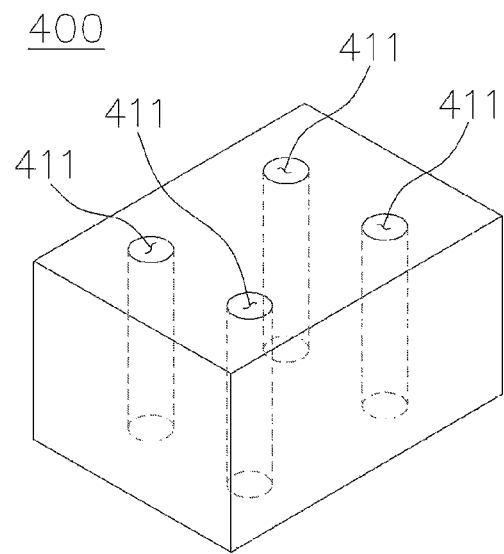
FIG. 22 is a perspective view illustrating another form of the concrete block used in the method of constructing the underwater concrete block structure according to the second embodiment of the present invention.

FIG. 12 is a perspective view of a concrete block used in a method of constructing an underwater concrete block structure according to a second embodiment of the present invention, FIGS. to 21 are views illustrating in sequence the method of constructing the underwater concrete block structure according to the second embodiment of the present invention, and FIG. 22 is a perspective view illustrating another form of the concrete block used in the method of constructing the underwater concrete block structure according to the second embodiment of the present invention.

In the present embodiment, the differences from the first embodiment will be mainly described. In addition, the same parts as the first embodiment will be referred to the description of the first embodiment, and a description thereof will be omitted.

First, the concrete block fabricating step is carried out.

As illustrated in FIG. 12, a plurality of concrete blocks 400 having four vertical holes 411 is fabricated. In some embodiments, only three vertical holes 411 may be formed. That is, the two vertical holes 411 are for the guide pole 200, and the other vertical holes 411 are for the auxiliary concrete column.

Four vertical holes 411 of this concrete block 400 are arranged in line in the horizontal direction. The arrangement of the vertical holes 411 may be changed according to the embodiment. For example, as illustrated in FIG. 22, the arrangement of the vertical holes 411 may be changed.

Figure 13:
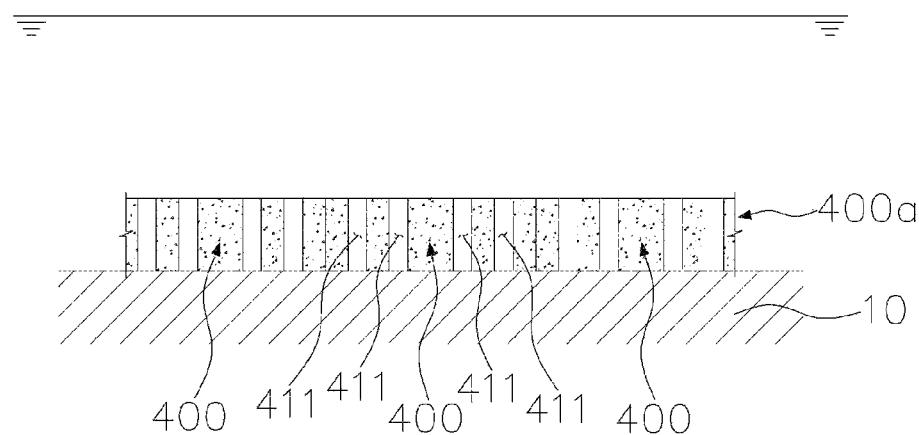
FIGS. 13 to 21 are views illustrating in sequence the method of constructing the underwater concrete block structure according to the second embodiment of the present invention.

After the concrete block fabricating step, the foundation concrete block structure formation step is performed. This step is a step of forming a foundation concrete block structure 400a by installing a plurality of concrete blocks 400 on the seafloor 10 as illustrated in FIG. 13.

After the foundation concrete block structure formation step, the guide pole installation step is performed.

The guide pole installation step is a step of inserting at least two or more guide poles 200 (two in the present embodiment) into each concrete block 400 forming the foundation concrete block structure 400a.

Figure 14:
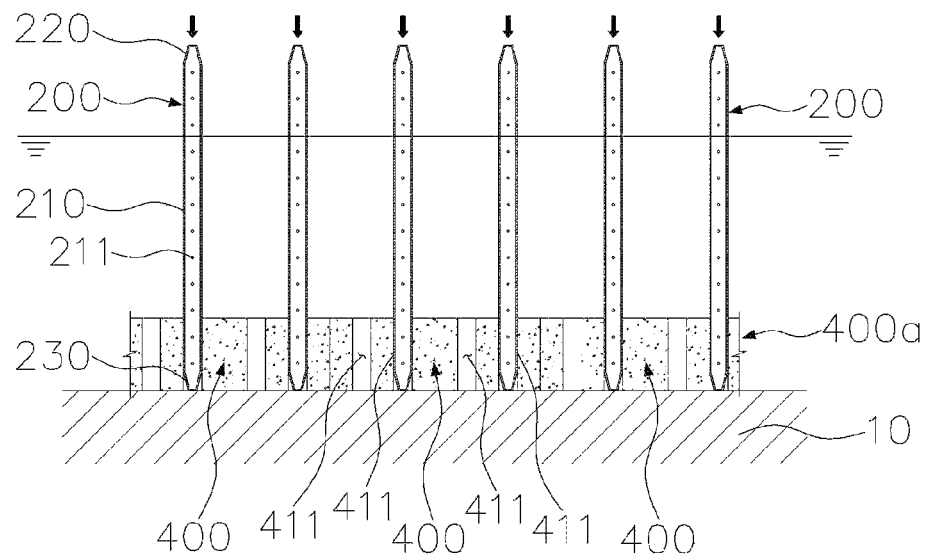

In this step, as illustrated in FIG. 14, two guide poles 200 are vertically installed for each concrete block 400 forming the foundation concrete block structure 400a.

After the guide pole installation step, a concrete block stack formation step is performed.

Figure 15:
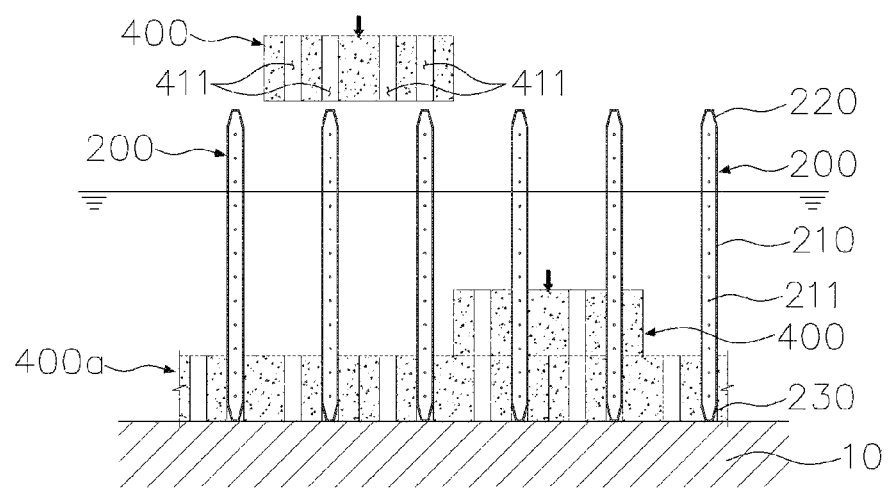
Figure 16:
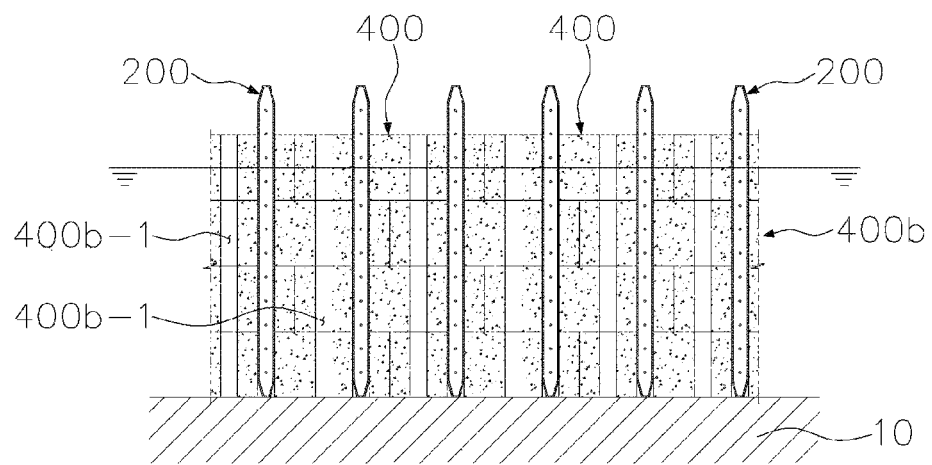

A concrete block stack 400b is formed by repeating the process of installing the concrete block 400 to be installed on the upper portion of the foundation concrete block structure 400a while being guided by the guide poles 200 as illustrated in FIGS. 15 and 16.

In detail, in the state in which the guide poles 200 are inserted into the two vertical holes 411 of the concrete block 400 to be installed, respectively, the concrete block 400 to be installed is installed on the upper portion of the foundation concrete block structure 400a while being guided by the two guide poles 200.

When the concrete block stack 400b is formed, as illustrated in FIG. 16, an auxiliary continuous hole 400b-1 that defines both the space in which the guide pole 200 is not installed and the space in which the vertical holes 110 of the concrete blocks 100 stacked in the vertical direction are continuously connected in the vertical direction is formed.

That is, the guide poles 200 are in the state of being inserted into two vertical holes of the four vertical holes 411 of each concrete block 400, and the other two vertical holes 411 are empty to form the auxiliary continuous hole 400b-1.

If three vertical holes 411 are formed in the concrete block 400, one of the vertical holes 411 will form the auxiliary continuous hole 400b-1 for the auxiliary concrete column.

After the concrete block stack formation step, an auxiliary concrete column formation step is performed.

Figure 17:
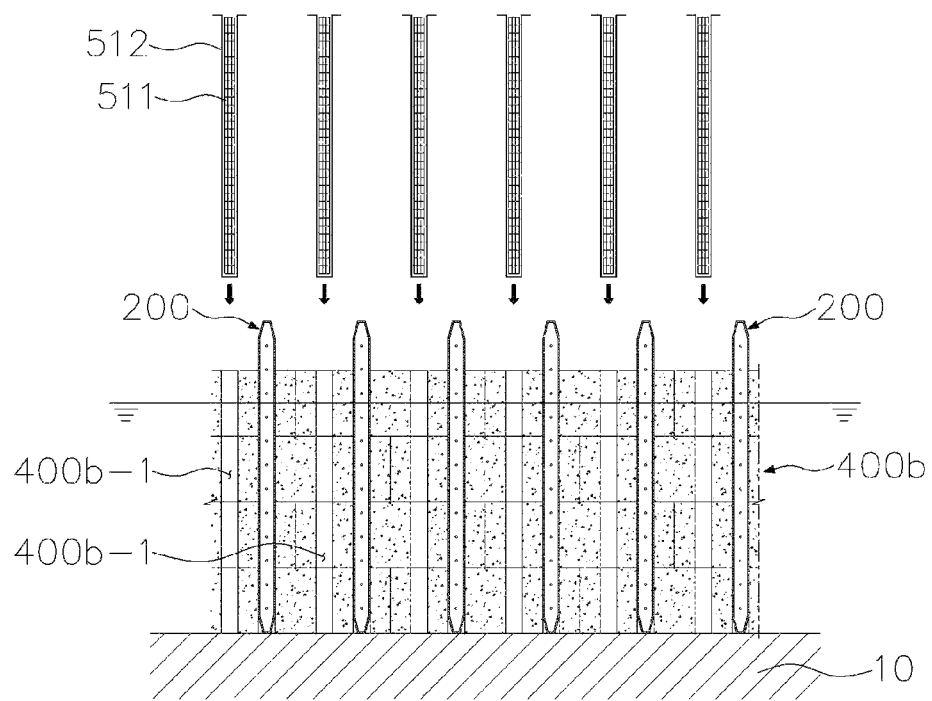
Figure 18:
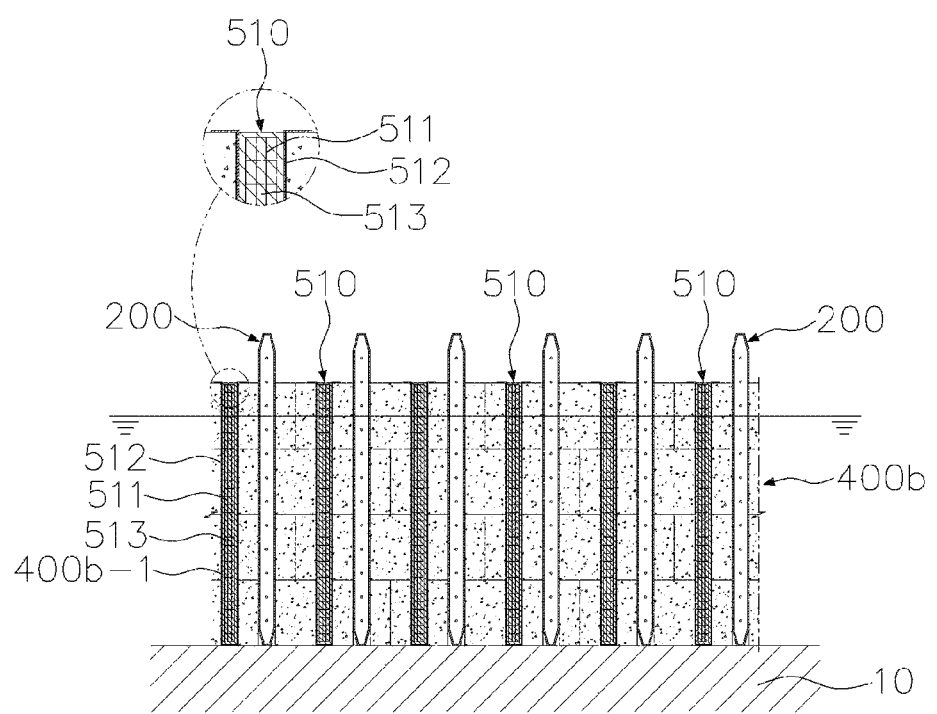

Then, a first reinforcing member 511 extending in the vertical direction and a first waterproof membrane 512 surrounding the lower part and the lateral sides of the first reinforcing member 511 are inserted together into the auxiliary continuous hole 400b-1 as illustrated in FIG. 17, and then a concrete material is injected into the first waterproof membrane 512 and is cured to form the auxiliary concrete part 513 as illustrated in FIG. 18.

Through this process, the auxiliary concrete column 510 is formed in the auxiliary continuous hole 400b-1, so that the plurality of concrete blocks 400 are partially bound to each other by the auxiliary concrete column 510.

After the auxiliary concrete column formation step, the main concrete column formation step is performed.

Figure 19:
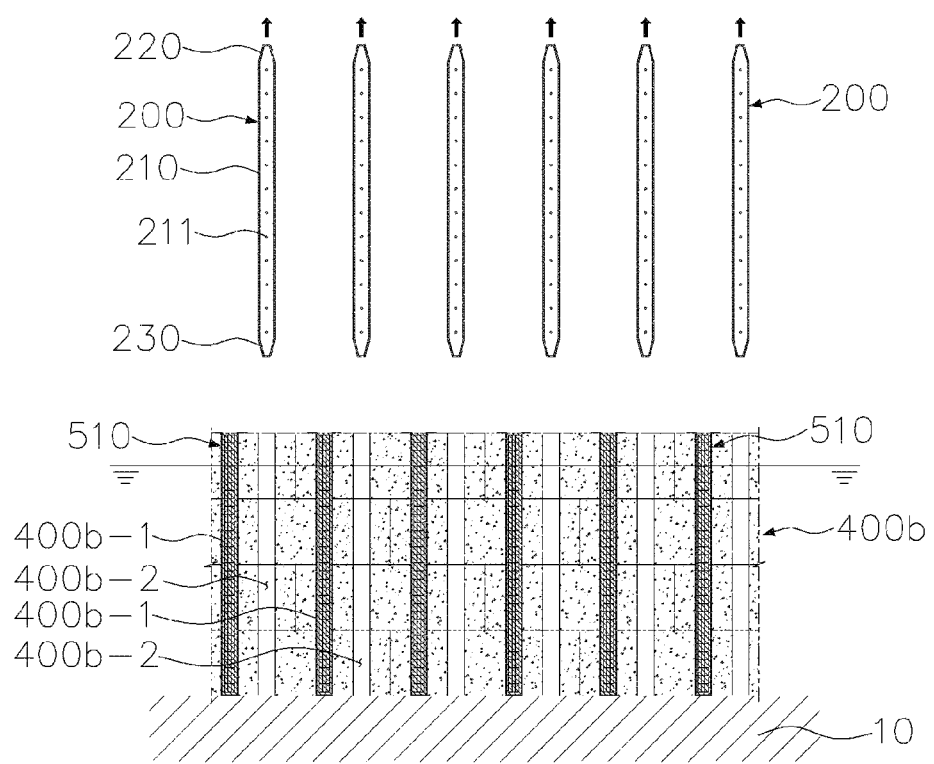

In the main concrete column formation step, as illustrated in FIG. 19, the guide poles 200 disposed in the concrete block stack 400b are removed, and a main concrete column 520 is formed in the main continuous hole 400b-2 that defines both the space in which the guide poles 200 is removed and the space in which the vertical holes of the concrete blocks 400 vertically stacked on one another are continuously connected in the vertical direction.

When the guide pole 200 is removed from the concrete block stack 400b as illustrated in FIG. 19, the main continuous hole 400b-2 for the main concrete column is formed.

Figure 20:
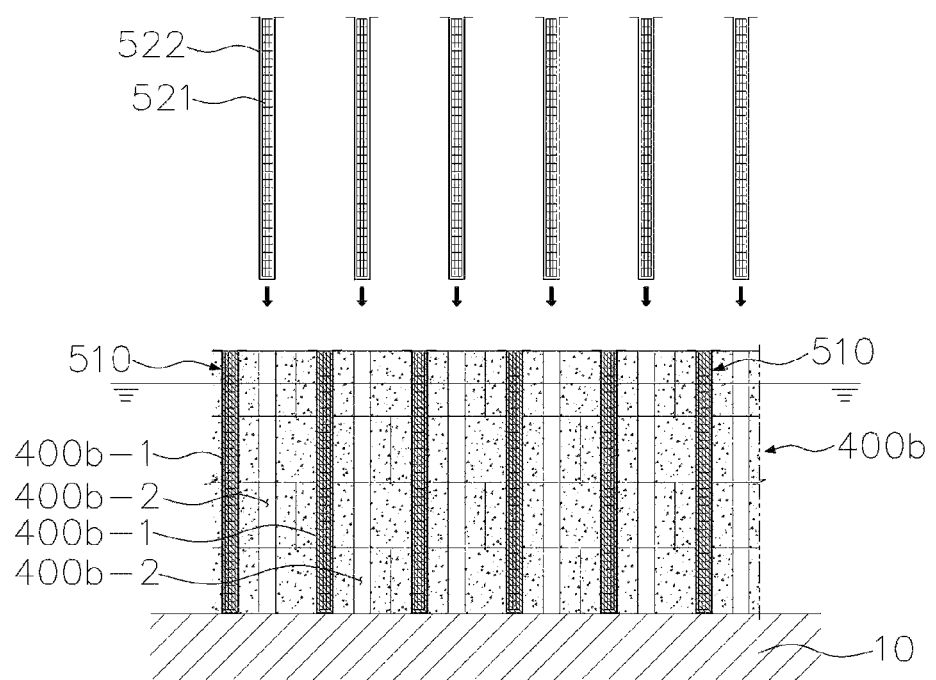
Figure 21:
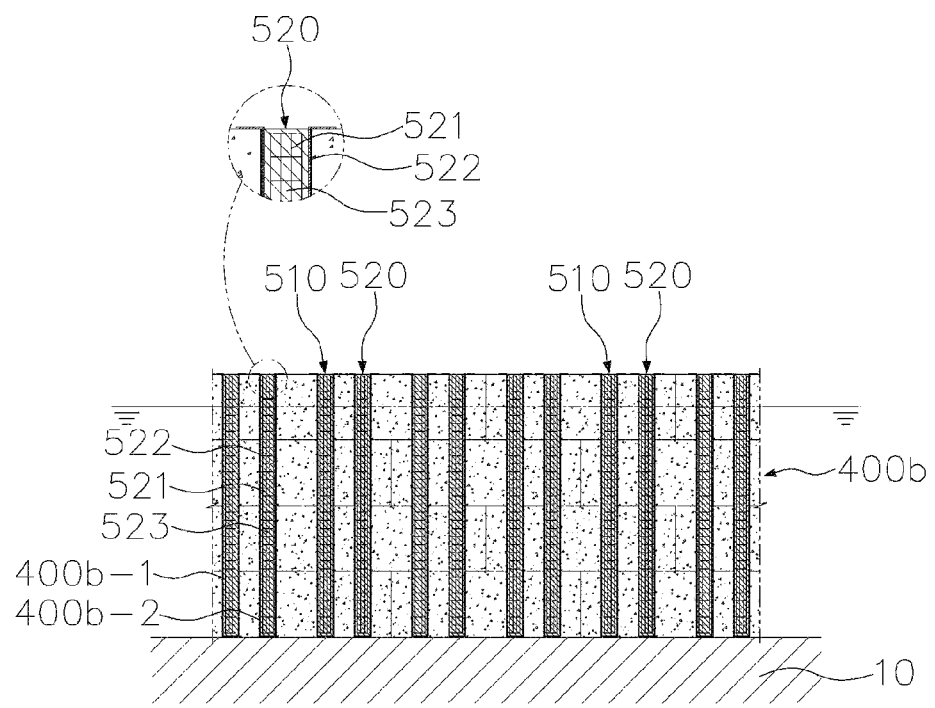

Then, a second reinforcing member 521 extending in the vertical direction and a second waterproof membrane 522 surrounding the lower part and the lateral sides of the second reinforcing member 521 are inserted together into the main continuous hole 400b-2 as illustrated in FIG. 20, and then a concrete material is injected and cured into the second waterproof membrane 522 to form the main concrete part 523 as illustrated in FIG. 21.

Through this process, as illustrated in FIG. 21, the main concrete column 520 is formed in the main continuous hole 400b-2, in which the guide pole 200 had been inserted, so that the plurality of concrete blocks 400 are completely bound by the main concrete column 520.

When the concrete columns 510 and 520 are formed in the concrete block stack 400b through the above process, the underwater concrete block structure is completed by firmly binding the plurality of concrete blocks 400 in the vertical and horizontal directions using the concrete columns 510 and 520.

When the underwater concrete block structure construction method according to the second embodiment is used, the individual concrete block 400 is installed in a fixed state by at least two guide poles 200, so that more stable and rapid underwater concrete block structure construction is possible.

Hereinafter, a modified form of the second embodiment of the present invention will be described.

Figure 23:
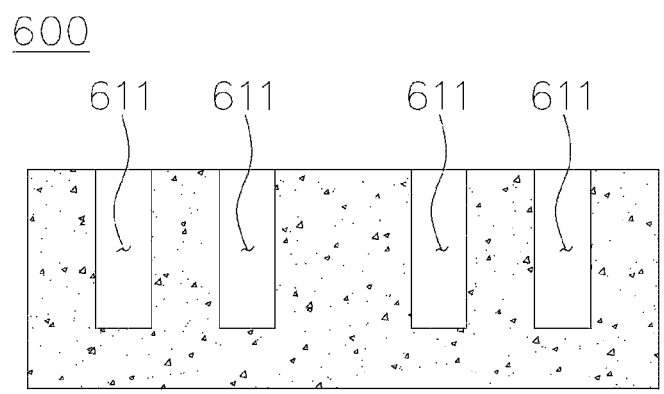
FIG. 23 is a cross-sectional view of a modified form of the concrete block of FIG. 12, and FIGS. 24 to 26 are views illustrating in sequence the method of constructing the underwater concrete block structure using the concrete block of FIG. 23 according to the second embodiment of the present invention.

FIG. 23 is a cross-sectional view of a modified form of the concrete block of FIG. 12, and FIGS. 24 to 26 are views illustrating in sequence the method of constructing the underwater concrete block structure using the concrete block of FIG. 23 according to the second embodiment of the present invention.

In this embodiment, the concrete block 600 of FIG. 23 is used together with the concrete block 400 of FIG. 12.

The concrete block 600 of FIG. 23 is provided with a vertical hole 611, a shape of which is in the form of a blind hole in which an upper part thereof is open and a lower part thereof is blocked. On the contrary, the vertical hole 411 of the concrete block 400 of FIG. 12 is in the form of a through hole penetrating through the concrete block 400 in the vertical direction.

After the two types of concrete blocks 400 and 600 are fabricated as described above, the step of forming the foundation concrete block structure is performed by the concrete blocks 600 of FIG. 23.

Figure 24:
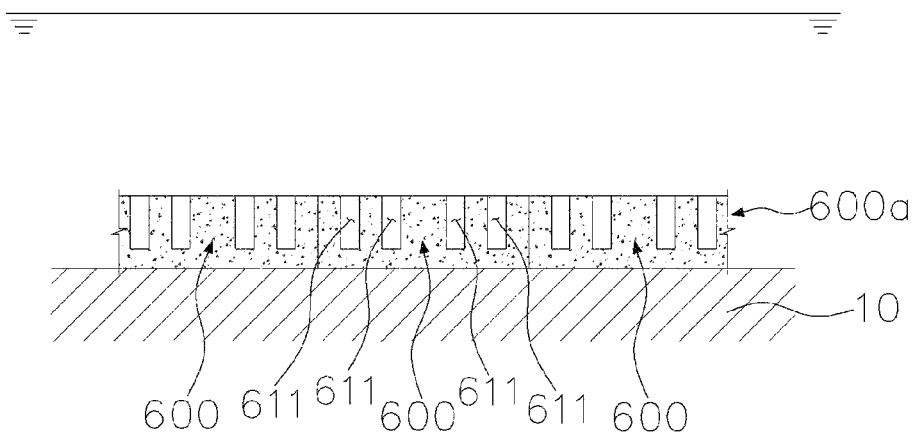

As a result, a plurality of concrete blocks 600 are installed on the seafloor 10 as illustrated in FIG. 24 to form the foundation concrete block structure 600a.

The subsequent steps proceed in the same manner as in the second embodiment.

Figure 25:
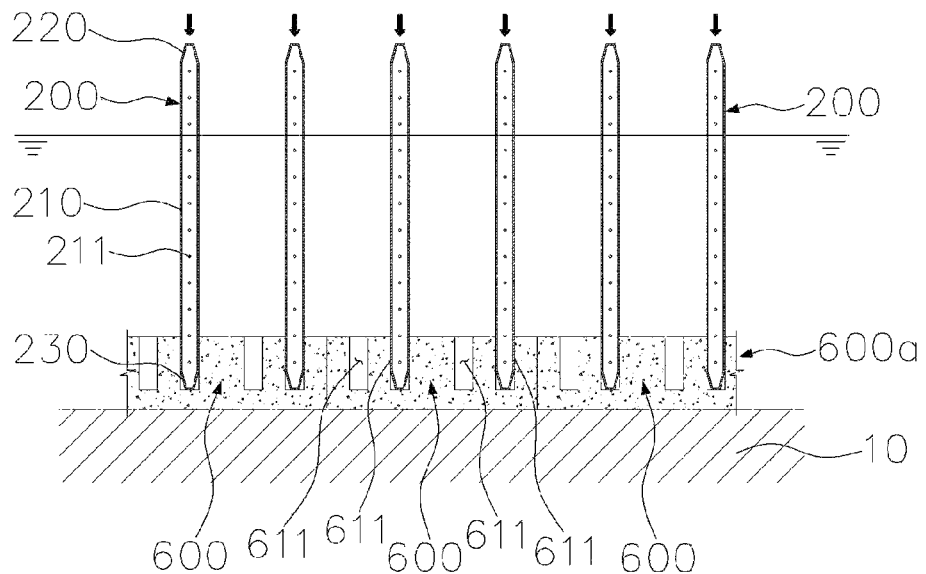

That is, after the foundation concrete block structure formation step, the guide pole installation step proceeds as illustrated in FIG. 25.

After the guide pole installation step, a concrete block stack formation step is performed.

In the concrete block stack formation step, the concrete block to be installed is the concrete block 400 of FIG. 12.

Figure 26:
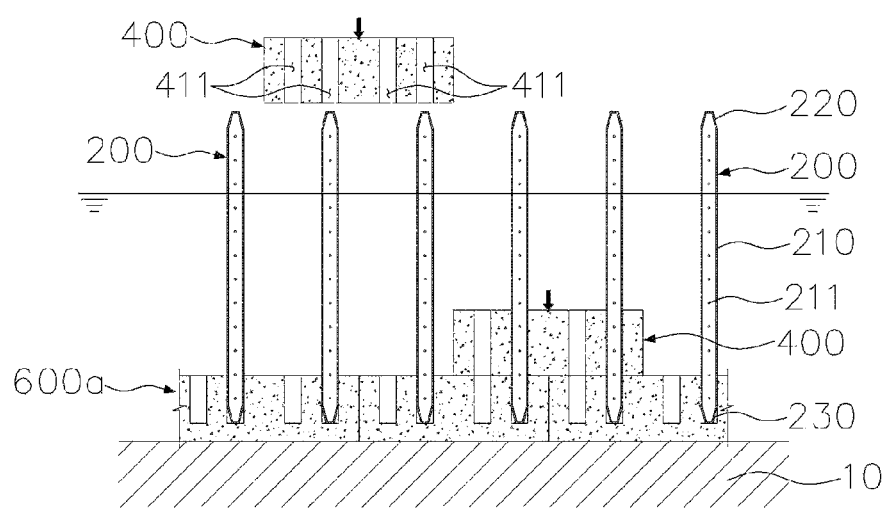

That is, as illustrated in FIG. 26, the concrete block stack is formed by repeating the process of installing the concrete block 400 on the upper portion of the foundation concrete block structure 600a while being guided by the guide poles 200.

Subsequent steps are the same as in the second embodiment, so detailed description thereof will be omitted.

Although a preferred embodiment of the present invention has been described for illustrative purposes, those skilled in the art will appreciate that various modifications, additions and substitutions are possible, without departing from the scope and spirit of the invention as disclosed in the accompanying claims.

Therefore, the embodiments described above are to be understood in all respects as illustrative and not restrictive. For example, each component described as a single type may be implemented in a distributed manner, and similarly, components described as distributed may be implemented in a combined form.

The scope of the present invention is defined by the following claims rather than the above description, and all changes or modifications derived from the meaning and scope of the claims and their equivalents should be construed as being included in the scope of the present invention.

The present invention may be used to construct an underwater concrete block structure.

The invention claimed is:

1. A method of constructing an underwater concrete block structure, the method comprising:
fabricating a plurality of concrete blocks having a vertical hole extending in the vertical direction;
after the concrete block fabricating step, forming a foundation concrete block structure by installing the concrete block on the seafloor;

after the foundation concrete block structure formation step, vertically installing at least one guide pole in the foundation concrete block structure by inserting a lower end of the guide pole extending in the vertical direction into the vertical hole of the concrete blocks forming the foundation concrete block structure so that an upper end of the guide pole protrudes above the surface of the water;

after the guide pole installation step, forming a concrete block stack by repeating a process of positioning the concrete block to be installed above the surface of the water such that the vertical hole of the concrete block to be installed is above the guide pole, and lowering the concrete block to be installed so that the concrete block to be installed is installed on an upper portion of the foundation concrete block structure in a state in which the guide pole is inserted into the vertical hole of the concrete block to be installed; and after the concrete block stack formation step, forming a main concrete column for binding the plurality of concrete blocks, extending in the vertical direction in a main continuous hole, the main continuous hole defining both the space in which the guide pole is removed by removing the guide poles disposed in the concrete block stack and the space in which the vertical holes of the concrete blocks vertically stacked on one another are continuously connected in the vertical direction.

2. The method according to claim 1, wherein at least two vertical holes are formed in the concrete block in the concrete block fabricating step, at least two guide poles are installed for each of the concrete blocks forming the foundation concrete block structure in the guide pole installation step, and the concrete block to be installed is installed on the upper portion of the foundation concrete block structure in a state in which at least two guide poles are inserted into the vertical holes of the concrete block to be installed in the concrete block stack formation step.

3. The method according to claim 1, wherein the main concrete column formation step comprises:
    forming a first main concrete column for binding the plurality of concrete blocks, extending in the vertical direction in a first main continuous hole, the first main continuous hole defining both the space in which some of the guide poles is removed by removing some of the guide poles disposed in the concrete block stack and the space in which the vertical holes of the concrete blocks vertically stacked on one another are continuously connected in the vertical direction; and
    after the first main concrete column formation step, forming a second main concrete column for binding the plurality of concrete blocks, extending in the vertical direction in a second main continuous hole, the second main continuous hole defining both the space in which the remaining guide pole is removed by removing the remaining guide poles in the concrete block stack and the space in which the vertical holes of the concrete blocks vertically stacked on one another are continuously connected in the vertical direction,
    wherein the first main concrete column is formed in one of the vertical holes of the concrete block forming the concrete block stack, and the second main concrete column is formed in the other vertical hole of the concrete block forming the concrete block stack.

4. The method according to claim 1, wherein in the concrete block fabricating step, at least three vertical holes are formed in the concrete block, wherein the concrete block stack formed in the concrete block stack formation step is provided with an auxiliary continuous hole that defines both the space in which the guide pole has not been inserted and the space in which the vertical holes of the concrete blocks vertically stacked on one another are continuously connected in the vertical direction, wherein between the concrete block stack formation step and the main concrete column formation step, an auxiliary concrete column for binding the plurality of concrete blocks is formed in the auxiliary continuous hole.

5. The method according to claim 1, wherein the guide pole has a hollow body portion formed to extend in the vertical direction in a shape corresponding to the cross section of the vertical hole of the concrete block, and an upper insert portion formed on an upper end of the body portion in an upwardly tapered shape.

6. The method according to claim 1, wherein the vertical hole of the concrete block is a through hole penetrating through the concrete block in the vertical direction.

7. The method according to claim 1, wherein the vertical hole of the concrete block forming the foundation concrete block structure is a blind hole in which an upper part thereof is open and a lower part thereof is blocked, wherein the vertical hole of the concrete block to be installed in the concrete block stack formation step is a through hole penetrating through the concrete block in the vertical direction.

\* \* \* \* \*